United States Patent
Lagneaux (10) Patent No.: US 7,635,060 B2
(45) Date of Patent: Dec. 22, 2009

(54) APPARATUS AND METHOD FOR SENSING CONDITIONS LOCAL TO A MODULAR CONVEYOR BELT

(75) Inventor: Jason M. Lagneaux, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 12/026,824

(22) Filed: Feb. 6, 2008

(65) Prior Publication Data

US 2009/0194391 A1 Aug. 6, 2009

(51) Int. Cl.
*B65G 43/00* (2006.01)

(52) U.S. Cl. .................................. 198/810.04

(58) Field of Classification Search ...............................
198/810.01–810.03, 502.1; 340/676
See application file for complete search history.

(56) References Cited

U.S. PATENT DOCUMENTS

| | | | |
|---|---|---|---|
| 3,695,745 A | 10/1972 | Kutsay | |
| 4,587,852 A | 5/1986 | Butler et al. | |
| 5,169,266 A * | 12/1992 | Sala et al. | 405/262 |
| 5,272,924 A | 12/1993 | Tassic et al. | |
| 6,047,814 A | 4/2000 | Alles et al. | |
| 6,158,576 A * | 12/2000 | Eagles et al. | 198/810.01 |
| 6,264,577 B1 | 7/2001 | Hutchins | |
| 6,291,991 B1 | 9/2001 | Schnell | |
| 6,563,417 B1 | 5/2003 | Shaw | |
| 6,581,755 B1 | 6/2003 | Wilke et al. | |
| 6,712,199 B1 | 3/2004 | Brueckner et al. | |
| 6,715,602 B1 | 4/2004 | Gartland | |
| 6,959,229 B2 | 10/2005 | Eidemiller | |
| 7,178,663 B2 * | 2/2007 | Schnell | 198/810.03 |
| 7,259,854 B2 | 8/2007 | Schnell | |
| 7,325,669 B2 | 2/2008 | Frost et al. | |
| 7,377,380 B2 | 5/2008 | Menke et al. | |
| 7,494,004 B2 * | 2/2009 | Stolyar et al. | 198/810.02 |

(Continued)

FOREIGN PATENT DOCUMENTS

DE 102005037117 A1 5/2006

(Continued)

OTHER PUBLICATIONS

PCT Search Report, PCT/US09/30906, prepared by ISA/EP, Mar. 26, 2009, European Patent Office, Rijswijk, Netherlands.

*Primary Examiner*—Mark A Deuble
(74) *Attorney, Agent, or Firm*—James T. Cronvich (57) ABSTRACT

Apparatus and method for sensing conditions local to a modular conveyor belt and wirelessly transmitting signals representing those conditions to an off-belt belt monitoring system. In a preferred version, a load cell pin installed in a clevis formed at a hinge joint between adjacent rows of a modular conveyor belt serves as a clevis pin to interconnect the rows and as a sensor sensitive to belt tension transmitted through the clevis. A special load-sensing belt module forms the clevis and holds electronic circuitry that takes the measurements made by the sensor, logs them in a memory element, and transmits them wirelessly to the belt monitoring system. The measurements may also be used as part of a closed-loop control system to control the speed or other operating characteristics of the conveyor system. Furthermore, a variety of sensors housed in sensor modules similar to standard conveyor belt modules may be installed in the belt as drop-in replacements for standard modules.

20 Claims, 4 Drawing Sheets

U.S. PATENT DOCUMENTS

| | | | |
|---|---|---|---|
| 2004/0232132 A1* | 11/2004 | Masaki | 219/229 |
| 2005/0109587 A1* | 5/2005 | Best et al. | 198/810.01 |
| 2007/0222612 A1 | 9/2007 | Krisl | |
| 2008/0006513 A1 | 1/2008 | Stolyar et al. | |

FOREIGN PATENT DOCUMENTS

| | | |
|---|---|---|
| EP | 0172745 A1 | 2/1986 |
| JP | 11334852 A1 | 2/2008 |

* cited by examiner

FIG. 7

APPARATUS AND METHOD FOR SENSING CONDITIONS LOCAL TO A MODULAR CONVEYOR BELT

BACKGROUND

The invention relates generally to power-driven conveyors and, more particularly, to methods and devices for making measurements of conditions local to modular conveyor belts from within the belts and wirelessly transmitting those measurements for monitoring or controlling the operation of the belt or the process in which it is used.

U.S. Pat. No. 4,587,852, "Conveyor Belt Tension Sensing," describes a radio transmitter and a tensile force sensor that includes strain gauges mounted in the limbs of a support link that is adapted for connection to joint components at the ends of straight-running flat belt portions. The strain gauges sense belt tension and derive a corresponding signal that is transmitted by the transmitter to a receiver and monitor. The belt has to be unlaced and relaced every time the support link is installed or removed. And because the belt is longer with the support link installed, the tension has to be adjusted.

It is often desirable to detect the tension at the outside of a modular plastic conveyor belt in a spiral conveyor. Knowing the tension in a side-flexing spiral or radius belt at the outside of a turn is useful in detecting imminent failures or in adjusting the tension for optimal operation. This is conventionally done in spiral belt conveyor systems by a data-logging tension-sensing device temporarily attached along outer belt modules as the belt follows its helical path along the spiral conveyor's drive tower. But the sensing device has to be removed before it reaches the belt's return path and falls off. When the device is removed, the belt tension data it collected is dumped to a computer for analysis.

Thus, there is a need for a device that can sense conditions, such as belt tension at the outside of a turn, in a conveyor belt without being destroyed and without having to be removed from the belt.

SUMMARY

This need and other needs are satisfied by a modular conveyor belt embodying features of the invention, including a load-sensing belt module. The modular conveyor belt is constructed of a series of rows of one or more belt modules linked together at hinge joints by hinge rods. Lateral passageways formed in the interleaved hinge elements of adjacent rows of belt module receive the hinge rods. The load-sensing belt module includes a load sensor that makes measurements of belt tension in at least a portion of the load-sensing belt module.

In another aspect of the invention, a modular plastic conveyor belt has a plurality of standard modules and at least one sensor module that includes a sensor making measurements of a local condition, a memory element for storing the measurements, and a transmitter for wirelessly transmitting signals representing the measurement.

In another aspect of the invention, a modular plastic conveyor belt comprises a series of rows of one or more standard belt modules having hinge element structure at opposite ends. The belt modules are linked together at hinge joints by hinge rods received in lateral passageways formed in interleaved hinge elements of adjacent rows of belt modules. The belt also comprises a sensor module that includes a sensor making measurements of a local condition and a transmitter for transmitting signals representing the measurements. Hinge element structure in the sensor module is similar to the hinge element structure of at least one of the standard belt modules so as to make the sensor module capable of replacing one of the standard modules without changing the length of the modular plastic conveyor belt.

In yet another aspect of the invention, a method for measuring tension in a modular conveyor belt comprises installing a load cell having a pin portion into a portion of a lateral passageway at a hinge joint to serve as a hinge pin linking adjacent rows together and to make measurements of tension in the belt.

Still another aspect of the invention provides a method for measuring a local condition in a modular conveyor belt constructed of a series of rows of one or more standard belt modules having hinge element structure at opposite ends. The belt modules are linked together at hinge joints by hinge rods received in lateral passageways formed in interleaved hinge elements of adjacent rows of belt modules. The method comprises: removing or omitting a standard belt module from a row of the modular conveyor belt; and replacing the standard belt module in the row with a first sensor module having hinge element structure like that of the removed or omitted module and further having a sensor sensing a local condition and making a measurement representing the local condition.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
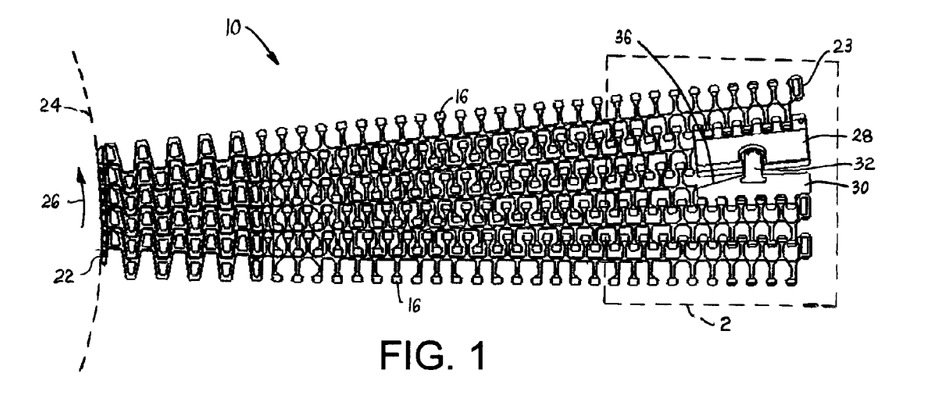
FIG. 1 is a top plan view of a portion of a modular conveyor belt embodying features of the invention including a load-sensing edge module.
Figure 2:
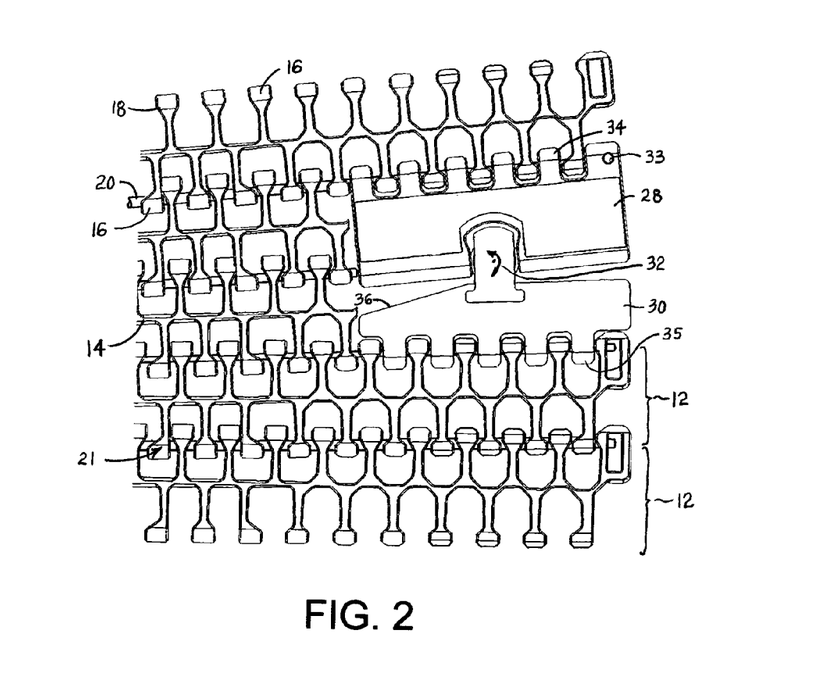
FIG. 2 is an enlarged view of a portion of the modular conveyor belt of FIG. 1 showing the edge module.

A portion of a modular conveyor belt following a curved path is shown in FIGS. 1 and 2. The conveyor belt 10 depicted in this example is a SPIRALOX™ 1.1 Radius modular plastic conveyor belt manufactured and sold by Intralox, L.L.C. of Harahan, La., U.S.A. The belt is constructed of a series of rows 12 of one or more belt modules 14. Hinge elements 16 having aligned openings 18 are laterally spaced apart along leading and trailing ends of each row. Hinge rods 20 received in lateral passageways formed by the aligned openings through interleaved hinge elements of adjacent belt rows connect the rows together at hinge joints 21 and allow the belt to articulate about drive and idle sprockets and return rollers.

The conveyor belt shown in this example is a radius, or side-flexing, belt capable of negotiating turns or wrapping helically around a spiral-conveyor drum or capstan. As shown in FIG. 1, the inside edge 22 of the belt collapses on itself in riding along the curved outer surface 24 of a drive capstan in a spiral conveyor. Meanwhile, the outside edge 23 of the belt is allowed to fan out because it is following a longer path around the capstan. The openings 18 in one or both of the leading and trailing hinge elements are elongated in the direction of belt travel 26 to allow the inside edge to collapse in a turn.

An important factor in determining the life of the spiral belt and its performance is the tension in the belt. In a spiral conveyor, in which a major portion of the belt's path is its helical path up or down the capstan, the majority of the belt tension is borne by the hinge elements at the outside of the turn. The collapsed inside edge and the interior portions of the belt carry almost no tension in a turn. A load-sensing belt module 28 is positioned at the outside edge of the belt row in place of a standard belt module or belt module edge portion. The load-sensing module extends inward from the outside edge of the belt far enough to capture all or at least a known percentage of the tension in the belt as it makes a turn. A complementary belt module 30 in an adjacent row cooperates with the load-sensing module to concentrate the belt tension at a measuring position 32 without changing the pull characteristics of the belt. Both the load-sensing module and the complementary module have hinge elements 34, 35 along one end designed to interleave with the hinge elements 16 of standard belt rows and receive a hinge rod. The hinge rod extending through the hinge elements on the load-sensing module is prevented from escaping at the outside of the module by a plug 33 that occludes the rod passageway through the interleaved hinge elements. A bias-cut edge 36 on the inner side of a complementary module provides room for the collapse of the belt inward of the outer edge.

Figure 3:
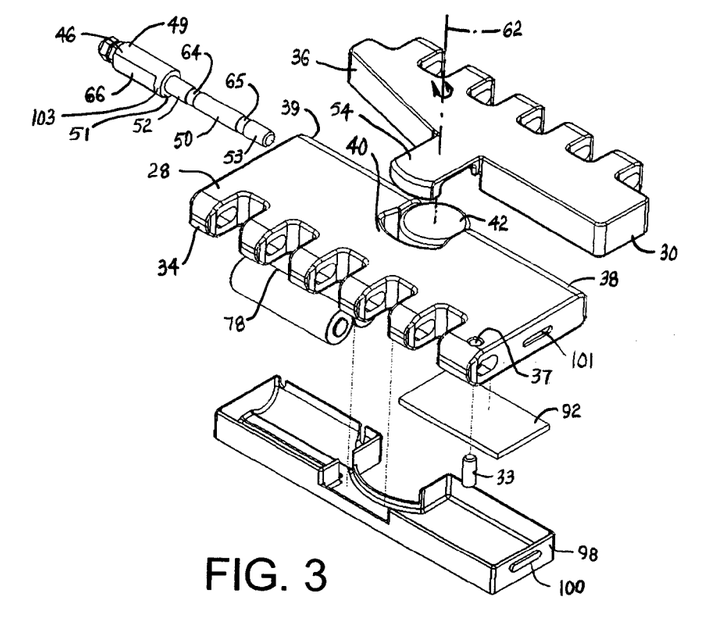
FIG. 3 is an exploded isometric view of the edge module of FIG. 1 viewed from the top side of the module.
Figure 4:
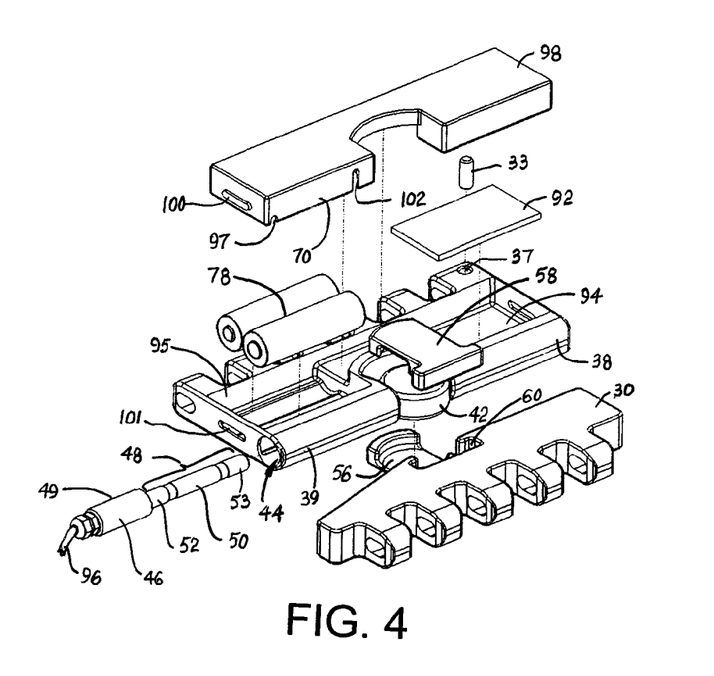
FIG. 4 is an exploded isometric view of the edge module of FIG. 1 viewed from the bottom side of the module.
Figure 5:
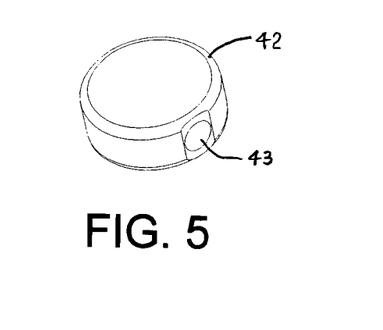
FIG. 5 is an isometric view of a two-axis bearing used in the edge module of FIG. 3.

Further details of the load-sensing module 28 and its complementary module 30 are shown in FIGS. 3 and 4. The load-sensing module has hinge elements 34 that are laterally spaced along one end to be compatible with the hinge elements of the standard belt modules. A hole 37 in the outside edge of the module intercepts the passageway through the hinge elements and receives the rod retention plug 33. The other end of the load-sensing module has only two enlarged hinge elements 38, 39 that form a shackle, or clevis 40. A two-axis bearing in the form of a puck 42 resides in the opening in the clevis. A bore 43 is formed through the outer circular wall of the puck as shown in FIG. 5. The bore is aligned coaxial with a passageway 44 through the clevis end of the load-sensing module. A load sensor, such as a load cell 46, is inserted into the passageway from the side edge of the module. The load cell has a pin portion 48 extending from a head 49 at a shoulder 51. The pin portion is centered in the bore of the puck, which can rotate about the pin. A central portion 50 of the pin resides in the puck; proximal and distal portions 52, 53 of the pin reside in the two hinge elements 38, 39 of the load-sensing module flanking the puck. Further details of an exemplary load cell are given in U.S. Pat. No. 3,695,096 to Kutsay, "Strain Detecting Load Cell," which is incorporated by reference.

The puck is received in a projection 54 extending outward from one end of the complementary belt module 30. The projection 54 has a recess 56 shaped to snugly, but rotationally hold half the puck. One end of a T-shaped retainer 58 sits in a mating receptacle 60 in the complementary belt module and holds the other half of the puck. The retainer may be fastened to the projection in a conventional manner, such as by screws, adhesives, or thermal bonding, such as by ultrasonic welding. Together, the projection and the retainer form an oversized hinge element coupled to the load-sensing module through the puck and the pin portion of the load cell. The circular outer wall of the puck allows the complementary module to rotate about a second axis 62 radial to the axis of the pin and perpendicular to the plane of the load-sensing module to properly load the load cell as the belt fans out at the outside of a turn.

When the load-sensing module is connected to the complementary module as described, the pin portion 48 of the load cell acts as a clevis pin. When the belt is in tension, the central portion 48 of the pin is pulled in one direction by the action of the complementary module's oversized hinge element on the puck, and the proximal and distal portions 52, 53 are pulled in the opposite direction by the action of the two hinge elements 38, 39 of the load-sensing module on the pin. This causes a shear stress in the pin in thinned regions 64, 65 between the central portion and the proximal and distal portions. Orthogally disposed pairs of strain gauges within the hollow pin portion of the load cell at the thinned regions are sensitive to the shear stress, which is proportional to the belt tension. To increase the sensitivity of the response of the load cell to belt tension, the load cell has a flat 66 formed on its head 49 that cooperates with a flat front edge 70 on a cover 98. The front edge of the cover juts into the passageway 44 from a cavity 95 that opens into the passageway to orient the pin circumferentially with the strain gauges in the direction of maximum sensitivity.

Figure 6:
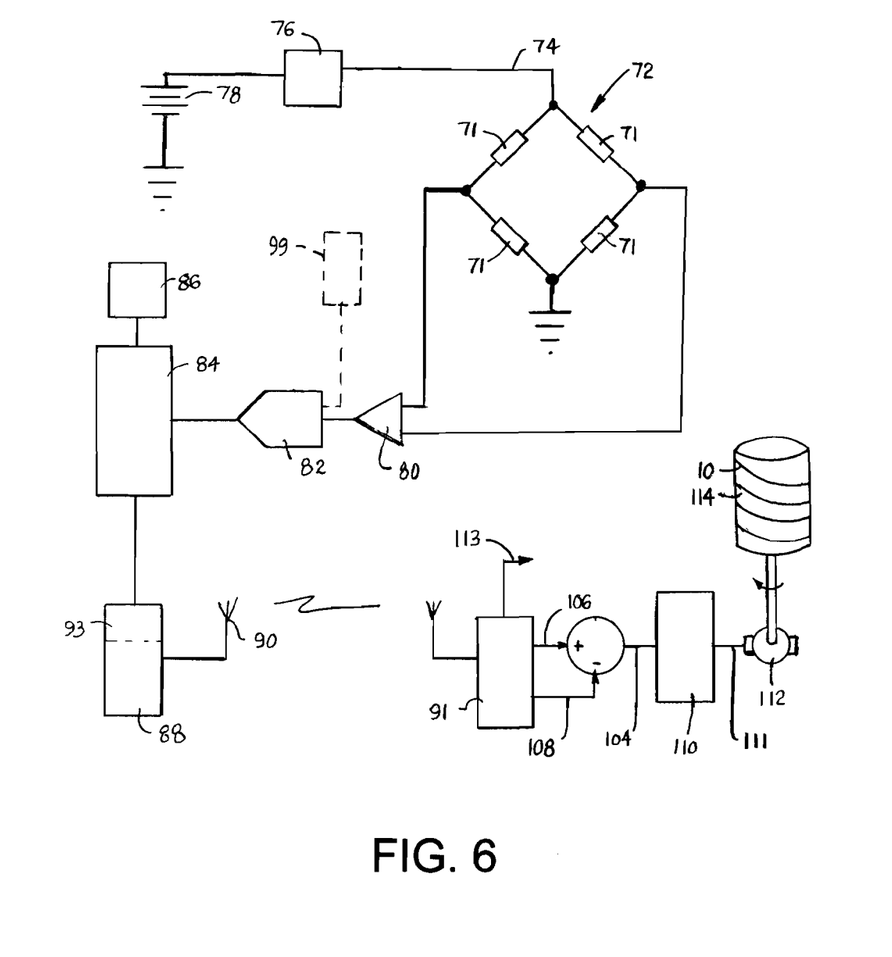
FIG. 6 is a block diagram of the electronic circuits used in the edge module of FIG. 1.

In a preferred version, the four strain gauges 71—two at each thinned region 64, 65 of the pin—are arranged electrically in individual legs of a conventional bridge circuit 72, as shown in FIG. 6. The bridge is energized by a regulated voltage 74 at one corner of the bridge. A voltage regulator 76 maintains a constant voltage to the bridge. A power source, for example, a battery 78, such as provided by a pair of 1.5-volt dry cells or a pair of 3.6-volt lithium ion cells, powers the voltage regulator and the other electronic components in the load-sensing module. The output of the bridge circuit is conditioned in a differential amplifier 80 and sent to an analog-to-digital converter 82, which periodically samples and digitizes the strain gauge signals and provides digital measurements to a controller 84, such as a microprocessor or microcontroller. The controller may log the digital measurements to a memory element 86 as is or after applying further algorithmic processing, such as filtering or scaling, to the measurements. The logged measurements may then be converted to radio signals in a transmitter 88, which may also include a receiver 93, and transmitted wirelessly from the belt over an antenna 90 to an off-belt belt monitoring and control system 91 that would include a transmitter and a receiver. The memory allows a number of measurements to be stored and uploaded wirelessly as a group in a single transmission when the antenna is close to the belt monitoring system. This can result in extended battery life by minimizing the transmission duty cycle and the distance over which the transmitter must transmit. But it would also be possible to transmit signals representing the measurements more frequently, such as transmitting one measurement each sample time. In such a case, a series of measurements would not have to be logged in a memory element, but single measurements could be stored before being transmitted. The circuitry may also use the receiver to receive command and control signals from the belt monitoring system.

The measurements may also be used to adjust the operation of the conveyor or the associated process in a closed-loop control system. An error signal 104 proportional to the difference between a signal or signal level 106 representing, for example, the tension in the belt and a tension set point 108, set through an operator interface in the monitoring and control system 91, is used as the input to a motor controller 110 that produces a motor-control signal 111 controlling the speed of a motor 112 driving the belt. The motor controller, as shown in the example of FIG. 6, or the belt monitoring and control system 91 may include the control logic to implement the control algorithm, which may define a proportional-integral-differential (PID) loop or other conventional control loop. The motor for a spiral conveyor system can be used to adjust the speed of the drive drum 114 and, consequently, the amount of overdrive used in driving the spiral belt 10 in its helical path around the drum. In the same way, an alternative sensor or an auxiliary sensor 99, such as a temperature sensor in the conveyor belt, could make temperature measurements, which could be transmitted from the belt to the monitoring and control system 91 to raise or lower the process temperature via another control signal 113. Thus, a sensor embedded in the belt can be used to measure local conveyor system conditions, such as ambient temperature, or belt conditions, such as tension, and control those conditions.

The electronic circuits, except the bridge, which resides in the load cell, reside on a circuit board 92 as shown in FIGS. 3 and 4. The battery resides in the cavity 95 adjacent to the load cell. The circuit board housing the electronics resides in another cavity 94 on the opposite side of the load-sensing belt module. Wires 96 passing through a mouse hole 97 in the front edge 70 of the cover 98 connect the bridge in the load cell to the electronics and the power source. The cover covers the cavities and retains the batteries and electronic components in the belt module. A slit 102 in the front edge of the cover receives a peripheral portion 103 of the head of the load cell between the flat 66 and the shoulder 51 to register the load cell axially in the passageway. The cover is conventionally fastened to the belt module, such as by a snap-fit provided by tabs 100 on the side edges of the cover received in mating receptacles 101 formed in the outside edges of the module, and forms its bottom surface. Like the other belt modules, the load-sensing belt module may be made of a plastic material, but it could alternatively be made of metal. The cover, however, is preferably made of a non-metal, such as plastic, that has little effect on the transmitter's range and wears against the conveyor belt's support rails with less friction than a metal. As another variation, the cavities could open onto the top of the module with the cover forming a portion of the top surface. As an alternative to the cover, potting compound could be used to retain and protect the electronic components and the batteries in the cavities.

Figure 7:
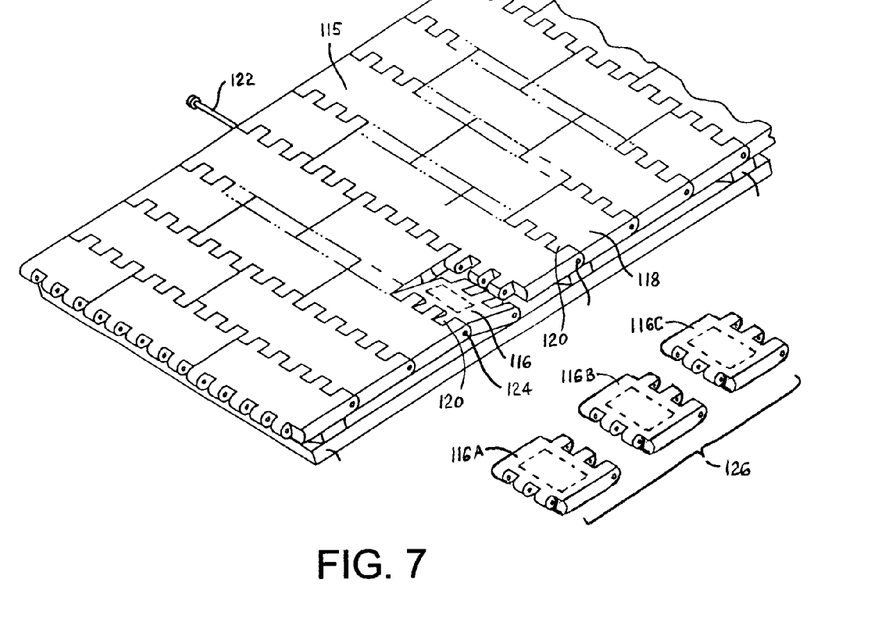
FIG. 7 is an isometric view of a portion of a modular conveyor belt embodying features of the invention including replaceable sensor modules.

In another version of a modular conveyor belt 115, shown in FIG. 7 as a straight-running belt, a sensor module 116 is used in place of a standard belt module 118. The sensor module has a physical structure similar to that of the standard belt module. In this example, the width and pitch of the two modules are the same, as is the configuration of hinge elements 120, e.g., spacing, size, lateral position, and number of hinge elements, along leading and trailing ends. A standard module or a sensor module is removed from the belt by retracting hinge rods 122 from the lateral hinge-eye passageways 124 through the interleaved hinge elements at each end of the belt row to free the module. An inventory 126 of sensor modules 116A-C containing various kinds of sensors within the body of the module or attached appurtenances may be maintained and selectively installed as drop-in replacements in place of the removed standard module or sensor module by reinserting the hinge rods in the passageways to retain the replacement module in position in the belt row. Thus, sensor modules housing a variety of sensors to measure various local conditions (e.g., belt tension, temperature, humidity) are designed to be easily replaceable, integral parts of the belt without significantly changing its length or its operating characteristics.

Although the invention has been described in detail with respect to a preferred version, other versions are possible. For example, the sensor-outfitted module, which has been described as a belt-edge module in the spiral-conveyor application and in the straight-running belt example, may be located in an interior position of the belt for other applications, such as measuring tension in a straight-running belt or with a sensor for sensing temperature. So, as these few examples suggest, the scope of the claims is not meant to be limited to the preferred versions described in detail.

What is claimed is:

1. A modular conveyor belt comprising:
    a series of rows of one or more belt modules linked together at hinge joints by hinge rods received in lateral passageways formed in interleaved hinge elements of adjacent rows of belt modules;
    wherein at least one of the belt modules is a load-sensing belt module that includes a load sensor making measurements of belt tension in at least a portion of the load-sensing belt module;
    wherein the load-sensing belt module further includes a memory element for storing as a group a series of the measurements of belt tension made by the load sensor.

2. A modular conveyor belt as in claim 1 wherein the load-sensing belt module further includes a transmitter to wirelessly transmit signals representative of the measurements of belt tension made by the load sensor.

3. A modular conveyor belt as in claim 2 wherein the load-sensing belt module further includes:
    a cavity housing the memory element and the transmitter; and
    a cover over the cavity to retain the memory element and the transmitter.

4. A modular conveyor belt as in claim 1 wherein the load-sensing belt module further includes one or more electrical cells to power the load sensor.

5. A modular conveyor belt as in claim 1 wherein the load-sensing belt module is positioned at an outside edge of the modular conveyor belt.

6. A modular conveyor belt as in claim 1 wherein the load-sensing module includes a plurality of laterally spaced apart hinge elements along one end and fewer laterally spaced hinge elements along the other end.

7. A modular conveyor belt as in claim 1 wherein the load-sensing belt module has a hinge element structure similar to that of another belt module in a position in the belt to allow for drop-in replacement of the belt module in the position by the load-sensing module.

8. A modular conveyor belt comprising:
    a series of rows of one or more belt modules linked together at hinge joints by hinge rods received in lateral passageways formed in interleaved hinge elements of adjacent rows of belt modules;
    wherein at least one of the belt modules is a load-sensing belt module that includes a load sensor making measurements of belt tension in at least a portion of the load-sensing belt module;
    wherein the load sensor includes a pin portion that is received in a portion of one of the lateral passageways at a hinge joint and is subjected to shear stress caused by belt tension.

9. A modular conveyor belt as in claim 8 wherein the load-sensing belt module and an adjacent belt module form a clevis at the hinge joint and wherein the pin portion of the load sensor serves as a clevis pin for the clevis connecting the load-sensing belt module to the adjacent belt module.

10. A modular conveyor belt comprising:
a series of rows of one or more belt modules linked together at hinge joints by hinge rods received in lateral passageways formed in interleaved hinge elements of adjacent rows of belt modules;
wherein at least one of the belt modules is a load-sensing belt module that includes a load sensor making measurements of belt tension in at least a portion of the load-sensing belt module;
wherein the load-sensing belt module includes a clevis at one end and wherein the load sensor includes a pin portion that serves as a clevis pin for the clevis and wherein a conveyor belt module adjacent the load-sensing belt module includes a projection rotatable about the pin portion.

11. A modular conveyor belt as in claim 10 further comprising a bearing rotatable about the axis of the pin portion within the clevis and rotatably received by the projection of the adjacent belt module to allow the adjacent belt module to pivot about the bearing about an axis radial to the axis of the pin portion.

12. A conveyor comprising:
a modular conveyor belt comprising:
a series of rows of one or more belt modules linked together at hinge joints by hinge rods received in lateral passageways formed in interleaved hinge elements of adjacent rows of belt modules;
wherein at least one of the belt modules is a load-sensing belt module that includes a load sensor making measurements of belt tension in at least a portion of the load-sensing belt module;
a controller producing motor-control signals from the sensor measurements to control the operation of the belt in a closed-loop system.

13. A modular plastic conveyor belt comprising:
a series of rows of one or more standard belt modules linked together at hinge joints by hinge rods received in lateral passageways formed in interleaved hinge elements of adjacent rows of belt modules;
at least one sensor module including:
a sensor making measurements of a local condition;
a memory element for storing the measurements as a group; and
a transmitter for wirelessly transmitting signals representing the group of measurements.

14. A modular plastic conveyor belt as in claim 13 wherein the at least one belt module has a cavity in which the memory element and the transmitter are embedded.

15. A modular plastic conveyor belt as in claim 13 wherein the sensor is a load cell measuring tension in the modular conveyor belt.

16. A method for measuring tension in a modular conveyor belt constructed of a series of rows of one or more belt modules hingedly linked together by hinge rods in lateral passageways forming hinge joints between adjacent rows of belt modules, the method comprising:
installing a load cell having a pin portion in a portion of a lateral passageway at a hinge joint to serve as a hinge pin linking adjacent rows together and to make measurements of tension in the modular conveyor belt.

17. The method of claim 16 further comprising wirelessly transmitting signals representing the measurements from one of the modules in the modular conveyor belt.

18. The method of claim 16 further comprising logging the measurements in a memory element disposed in one of the modules in the modular conveyor belt.

19. The method of claim 18 further comprising wirelessly transmitting a signal representing a series of the measurements logged in the memory element.

20. The method of claim 16 further comprising installing the load cell in an edge portion of the modular conveyor belt.

* * * * *

UNITED STATES PATENT AND TRADEMARK OFFICE
CERTIFICATE OF CORRECTION

| | | |
|---|---|---|
| PATENT NO. | : 7,635,060 C1 | Page 1 of 1 |
| APPLICATION NO. | : 90/009833 | |
| DATED | : June 28, 2011 | |
| INVENTOR(S) | : Jason M. Lagneaux | |

It is certified that error appears in the above-identified patent and that said Letters Patent is hereby corrected as shown below:

IN THE CLAIMS:

In Column 1, line 51 (Claim 3), the phrase "a cover over the cavity to retain the memory element and the transmitter" should begin a new paragraph on the next line.

In Column 1, line 60 (Claim 6), the word "modules" should read --module--.

In Column 2, line 3 (Claim 13), the following phrase should be changed from italics to regular type:
   "a series of rows of one or more standard belt modules
   linked together at hinge joints by hinge rods received in
   lateral passageways formed in interleaved hinge ele-
   ments of adjacent rows of belt modules;"

Signed and Sealed this
Fourteenth Day of February, 2012

David J. Kappos
*Director of the United States Patent and Trademark Office*

(12) EX PARTE REEXAMINATION CERTIFICATE (8373rd)
United States Patent
Lagneaux (10) Number: US 7,635,060 C1
(45) Certificate Issued: Jun. 28, 2011

(54) APPARATUS AND METHOD FOR SENSING CONDITIONS LOCAL TO A MODULAR CONVEYOR BELT

(75) Inventor: Jason M. Lagneaux, River Ridge, LA (US)

(73) Assignee: Laitram L.L.C., Harahan, LA (US)

Reexamination Request:
No. 90/009,833, Sep. 30, 2010

Reexamination Certificate for:
Patent No.: 7,635,060
Issued: Dec. 22, 2009
Appl. No.: 12/026,824
Filed: Feb. 6, 2008

(51) Int. Cl.
*B65G 43/00* (2006.01)

(52) U.S. Cl. .................................... 198/810.04
(58) Field of Classification Search ............... 198/853
See application file for complete search history.

(56) References Cited

U.S. PATENT DOCUMENTS 3,695,096 A 10/1972 Kutsay
4,587,852 A * 5/1986 Butler et al. ........... 198/810.04
5,921,379 A * 7/1999 Horton ........................ 198/852

FOREIGN PATENT DOCUMENTS

EP 0716991 A1 6/1996

* cited by examiner

*Primary Examiner* — Peter C. English (57) ABSTRACT

Apparatus and method for sensing conditions local to a modular conveyor belt and wirelessly transmitting signals representing those conditions to an off-belt belt monitoring system. In a preferred version, a load cell pin installed in a clevis formed at a hinge joint between adjacent rows of a modular conveyor belt serves as a clevis pin to interconnect the rows and as a sensor sensitive to belt tension transmitted through the clevis. A special load-sensing belt module forms the clevis and holds electronic circuitry that takes the measurements made by the sensor, logs them in a memory element, and transmits them wirelessly to the belt monitoring system. The measurements may also be used as part of a closed-loop control system to control the speed or other operating characteristics of the conveyor system. Furthermore, a variety of sensors housed in sensor modules similar to standard conveyor belt modules may be installed in the belt as drop-in replacements for standard modules.

US 7,635,060 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8-12 and 16-20 is confirmed.

Claims 1-7 and 13-15 are determined to be patentable as amended.

New claims 21-36 are added and determined to be patentable.

1. A [modular] conveyor [belt] comprising:
   a) *a modular conveyor belt comprisng:*
   a series of rows of one or more belt modules linked together at hinge joints by hinge rods received in lateral passageways formed in interleaved hinge elements of adjacent rows of belt modules;
   wherein at least one of the belt modules is a load-sensing belt module that includes a load sensor making measurements of belt tension in at least a portion of the load-sensing belt module; *and*
   wherein the load-sensing belt module further includes a memory element for storing as a group a series of the measurements of belt tension made by the load sensor*;*
   *and*
   *b) a controller producing control signals from the sensor measurements to control the operation of the belt in a closed-loop system.*

2. A [modular] conveyor [belt] as in claim 1 wherein the load-sensing belt module further includes a transmitter to wirelessly transmit signals representative of the measurements of belt tension made by the load sensor.

3. A [modular] conveyor [belt] as in claim 2 wherein the load-sensing belt module further includes:
   a cavity housing the memory element and the transmitter; and a cover over the cavity to retain the memory element and the transmitter.

4. A [modular] conveyor [belt] as in claim 1 wherein the load-sensing belt module further includes one or more electrical cells to power the load sensor.

5. A [modular] conveyor [belt] as in claim 1 wherein the load-sensing belt module is positioned at an outside edge of the modular conveyer belt.

6. A [modular] conveyor [belt] as in claim 1 wherein the load-sensing modules includes a plurality of laterally spaced apart hinge elements along one end and fewer laterally spaced hinge elements along the other end.

7. A [modular] conveyor [belt] as in claim 1 wherein the load-sensing belt module has a hinge element structure similar to that of another belt module in a position in the belt to allow for drop-in replacement of the belt module in the position by the load-sensing module.

13. A [modular plastic] conveyor [belt] comprising:
   *a modular plastic conveyor belt comprising:*
   *a series of rows of one or more standard belt modules linked together at hinge joints by hinge rods received in lateral passageways formed in interleaved hinge elements of adjacent rows of belt modules;*
   at least one sensor module including:
      a sensor making measurements of a local condition;
      a memory element for storing the measurements as a group; and
      a transmitter for wirelessly transmitting signals representing the group of measurements*; and*
   *a controller producing control signals from the sensor measurements to control the operation of the belt in a closed-loop system.*

14. A [modular plastic] conveyor [belt] as in claim 13 wherein the at least one belt module has a cavity in which the memory element and the transmitter are embedded.

15. A [modular plastic] conveyor [belt] as in claim 13 wherein the sensor is a load cell measuring tension in the modular conveyor belt.

*21. A conveyor as in claim 1 wherein the load sensor includes a pin portion that is received in a portion of one of the lateral passageways at a hinge joint and is subjected to shear stress caused by belt tension.*

*22. A modular conveyor belt as in claim 8 wherein the load-sensing belt module further includes a memory element for storing as a group a series of the measurements of belt tension made by the load sensor.*

*23. A modular conveyor belt as in claim 22 wherein the load-sensing belt module further includes a transmitter to wirelessly transmit signals representative of the measurements of belt tension made by the load sensor.*

*24. A modular conveyor belt as in claim 23 wherein the load-sensing belt module further includes:*
   *a cavity housing the memory element and the transmitter; and*
   *a cover over the cavity to retain the memory element and the transmitter.*

*25. A modular conveyor belt as in claim 22 wherein the load-sensing belt module further includes one or more electrical cells to power the load sensor.*

*26 A modular conveyor belt as in claim 22 wherein the load-sensing belt module is positioned at an outside edge of the modular conveyor belt.*

*27. A modular conveyor belt as in claim 22 wherein the load-sensing module includes a plurality of laterally spaced apart hinge elements along one end and fewer laterally spaced hinge elements along the other end.*

*28. A modular conveyor belt as in claim 22 wherein the load-sensing belt module has a hinge element structure similar to that of another belt module in a position in the belt to allow for drop-in replacement of the belt module in the position by the load-sensing module.*

*29. A conveyor as in claim 12 wherein the load-sensing belt module further includes a transmitter to wirelessly transmit signals representative of the measurements of belt tension made by the load sensor.*

*30. A conveyor as in claim 12 wherein the load-sensing belt module further includes one or more electrical cells to power the load sensor.*

*31. A conveyor as in claim 12 wherein the load-sensing belt module is positioned at an outside edge of the modular conveyor belt.*

*32. A conveyor as in claim 12 wherein the load-sensing module includes a plurality of laterally spaced apart hinge* elements along one end and fewer laterally spaced hinge elements along the other end.

33. A conveyor as in claim 12 wherein the load-sensing belt module has a hinge element structure similar to that of another belt module in a position in the belt to allow for drop-in replacement of the belt module in the position by the load-sensing module.

34. A modular plastic conveyor belt comprising:

a series of rows of one or more standard belt modules linked together at hinge joints by hinge rods received in lateral passageways formed in interleaved hinge elements of adjacent rows of belt modules;

at least one sensor module including:

a sensor making measurements of a local condition, wherein the sensor includes a pin portion that is received in a portion of one of the lateral passageways at a hinge joint and is subjected to shear stress caused by belt tension;

a memory eleement for storing the measurements as a group; and a transmitter for wirelessly transmitting signals representing the group of measurements.

35. A modular plastic conveyor belt as in claim 34 wherein the at least one belt module has a cavity in which the memory element and the transmitter are embedded.

36. A modular plastic conveyor belt as in claim 34 wherein the sensor is a load cell measuring tension in the modular conveyor belt.

* * * * *